Patented June 11, 1929.

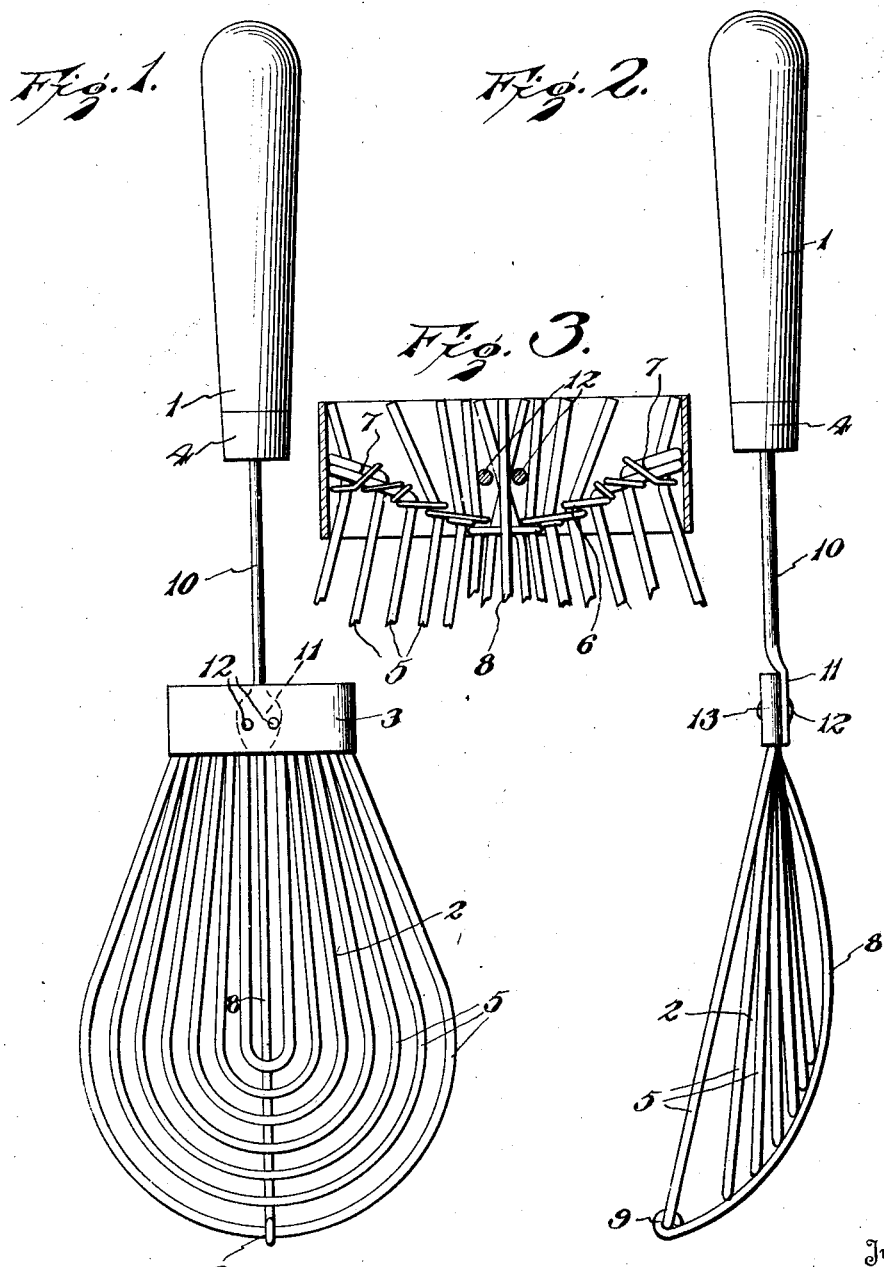

1,717,282

UNITED STATES PATENT OFFICE.

CALLIE D. TIFFANY, OF JACKSON, TENNESSEE.

STIRRING SPOON.

Application filed January 14, 1928. Serial No. 246,725.

This invention relates to culinary implements and more particularly to a stirring spoon intended to be used when mixing batter for a cake.

One object of the invention to to provide a stirring or mixing spoon having its bowl formed of wire strands each having a U-shaped contour and being spaced from each other so that when the spoon is in use the batter may pass between the strands and thereby be acted upon in a very efficient manner and thoroughly mixed.

Another object of the invention is to connect the ends of the strands with a collar carried by the handle of the spoon so that the strands will be firmly secured and prevented from working loose and their rear end portions prevented from moving out of proper relation to each other.

Another object of the invention is to brace the bowed strands through the medium of a longitudinally curved rod which serves to properly dispose the bowed portions of the strands with respect to each other and provide the spoon with a bowl having a concavo-convex formation.

The invention is illustrated in the accompanying drawing, wherein

Figure 1 is a top plan view of the improved mixing spoon;

Fig. 2 is a view showing the spoon in side elevation, and

Fig. 3 is an enlarged fragmentary view showing the collar in section and the rear portion of the bowl in top plan.

The improved stirring or mixing spoon includes a handle 1 and a bowl 2 which includes a collar 3 engaged with the forward end of the handle. The handle is preferably formed of wood and tapers forwardly so that it may be easily grasped. If desired, a ferrule 4 may be provided about the forward end of the handle to reinforce it and prevent danger of the handle splitting.

The bowl 2 consists of a number of strands 5 of resilient wire which are bent to a substantially U-shape, as shown in Fig. 1. It should be noted that the bowed portions of the strands increase in size towards the margin of the bowl, as shown in Fig. 1, and that the strands are not only spaced from each other transversely of the bowl, as shown in this figure, but also spaced from each other, as shown in Fig. 2. Therefore, the bowl is of a concavo-convex formation similar to an ordinary spoon bowl. The collar 3 is formed from a band of sheet metal and this collar is disposed about the end portions of the wire strands and pressed into tight engagement with them. Before the collar is applied to the strands, a strand of flexible wire 6 is wrapped about the strands 5, as shown in Fig. 3, to provide a tie or brace which firmly connects the rear ends of the bowl forming strands and retains them in proper spaced relation to each other. It should be noted that certain of the bowl forming strands have their end portions bent transversely, as shown as 7, and bent about other strands to give additional strength to the rear portion of the bowl. After the collar has been clamped about the rear end portions of the bowl forming strands, melted solder is preferably poured into the collar to firmly anchor it to the bowl and prevent dirt from accumulating in the collar. A wire bracing strand 8 which is curved longitudinally, as shown in Fig. 2, has its outer end formed with an eye 9 clinched about the bowed portion of the outer strand 5 and the remaining bowl forming strands are soldered or welded to the brace. The strand from which the brace is formed is of such length that its rear portion extends into the collar where it is firmly held when the collar is clinched and the solder poured into the collar has set. The shank 10 of the handle terminates in a flattened foot or head 11 which is disposed against the collar and secured by rivets 12 passed through the foot and collar. Therefore, the handle will be firmly held in engagement with the bowl and there will be no danger of their becoming separated.

When the mixing spoon is in use, the handle is grasped in the usual manner and as the cake batter is stirred the wires 5 will pass through it and serve very effectively to cause the ingredients to be thoroughly intermingled. In view of the fact that the brace wire is curved longitudinally and causes the bowl to assume a concavo-convex formation, the bowl of the spoon will conform to the contour of the walls and bottom of a mixing bowl and thereby allow all portions of the batter to be acted upon.

Having thus described the invention, I claim:

1. A mixing spoon comprising a handle, a bowl consisting of a plurality of strands spaced from each other, a brace extending longitudinally of the bowl intermediate the width thereof and secured to one of said strands, and connecting means for the rear end portions of the strands and brace and firmly secured to the forward end of the handle.

2. A mixing spoon comprising a handle, a collar at the forward end of the handle having end portions projecting from opposite sides thereof, a bowl consisting of U-shaped members spaced from each other with their arms extending rearwardly and anchored in said collar, and a brace rod secured to said U-shaped members intermediate the width of said bowl with its rear portion extending into said collar.

3. A mixing spoon comprising a handle, a collar at the forward end of the handle having end portions projecting from opposite sides thereof, a bowl consisting of U-shaped members spaced from each other with their arms extending rearwardly and fitted into said collar, and a brace for the rear end portions of said U-shaped members consisting of a wire extending transversely across the bowl and intertwined with the rear end portions of the U-shaped members.

4. A mixing spoon comprising a handle, a collar at the forward end of the handle, a bowl consisting of U-shaped members spaced from each other with their arms extending rearwardly and fitted into said collar, certain of the arms having their rear end portions bent transversely and about adjacent arms, and a bracing wire coiled about the rear end portions of the arms and extending from one arm to another between coils.

In testimony whereof I affix my signature.

CALLIE D. TIFFANY. [L. S.]